J. B. RUMSEY.
Car Brake.
No. 53,235.
Patented Mar. 13, 1866.
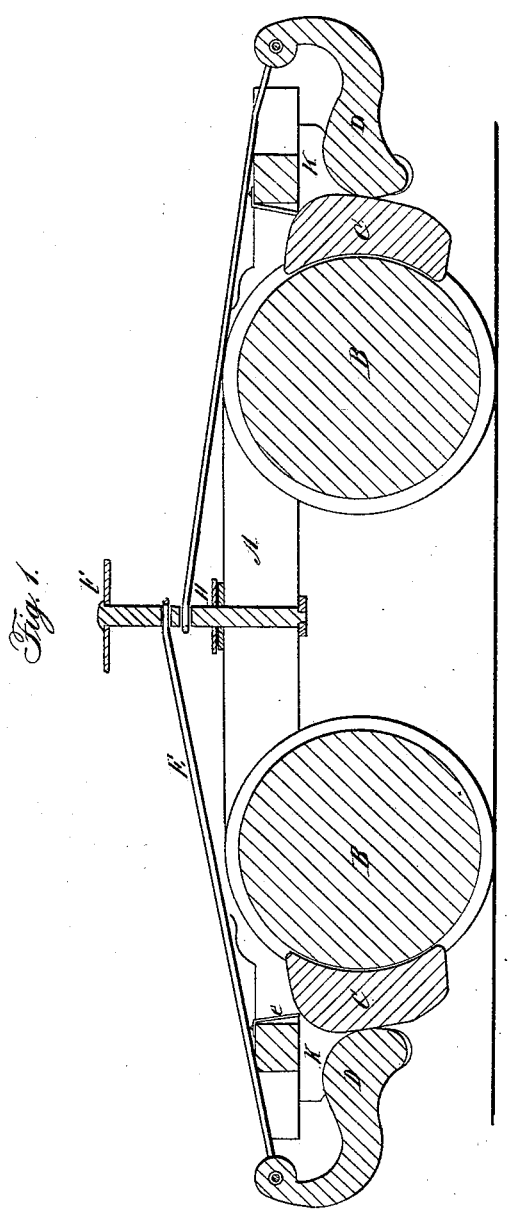
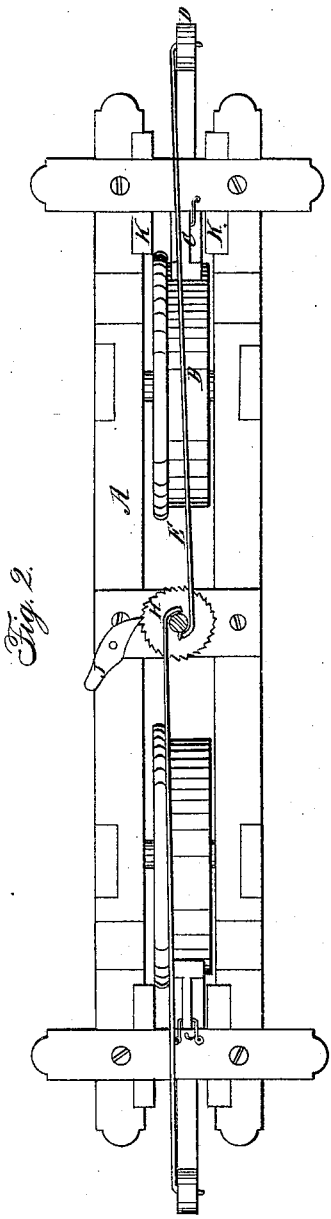
Witnesses:
Inventor:

UNITED STATES PATENT OFFICE.

JESSE B. RUMSEY, OF TIFFIN, OHIO, ASSIGNOR TO JAMES G. RUMSEY, OF WASHINGTON, DISTRICT OF COLUMBIA.

IMPROVED CAR-BRAKE.

Specification forming part of Letters Patent No. 53,235, dated March 13, 1866.

*To all whom it may concern:*

Be it known that I, JESSE B. RUMSEY, of Tiffin, Seneca county, and State of Ohio, have invented certain new and useful Improvements in the Mode of Stopping Cars by Means of the Application of a Cam-Lever; and I do hereby declare that the following is a full, clear, and exact description of the same, reference being had to the accompanying drawing, and to the letters of reference marked thereon, making a part of this specification.

A represents the car-truck, which is provided with wheels B, said truck and wheels being made in any of the ordinary and known ways. Attached to the truck, and resting near the wheels B, are the brakes C. These brakes are constructed of any suitable material, and are made to correspond with shape of the wheels, being secured to the truck A, as seen in the accompanying drawing at $e$. Said brakes are placed slightly forward of the front wheels and just in the rear of the hindmost wheels of the truck.

D is a lever, which is made of any substantial metal and in the form shown in the drawing herewith presented. These levers are secured to the truck A by braces K, which are attached to the truck. Said lever D is crooked and has a cam at the lower extremity. This lever is adjusted so that it sits against the forward part of the brake C of the forward wheel and the rear of the brake in the rearmost wheel.

E represents two chains or substantial cords which extend from the upper part of the lever D to a brake-shaft, F. These chains are fastened through openings in the brake-shaft, one above the other. The brake-shaft F is a vertical metallic rod set in the center of the car-truck, being provided with a dog, J, and ratchet H to hold the shaft in the required position. This shaft is made in the form and manner of the shafts now commonly used on railroad-cars.

The brake herein described can be attached to any of the cars now in use, being attended with but little expense. The levers D being on each side of the car-truck, a horizontal bar similar to the ones now in use can be near the levers D and secured, whereas the chains E will then be attached to said bar instead of the lever itself, as herein shown. By turning the brake-shaft F the chains E will wind around said shaft, drawing the head of the lever D toward the center of the car, thus pressing the cam of said lever against the brake C, which brake, by the pressure being carried or forced against the wheels B, causing the wheels to cease their revolutions by the friction of the brakes.

Having thus fully described my invention, what I claim as new, and desire to secure by Letters Patent, is—

The combination of the lever D with the chains E, brake-shaft F, and brake C, when used in the manner and for the purposes herein set forth.

In witness that I claim the foregoing I have hereunto set my hand in the presence of two witnesses.

J. B. RUMSEY.

Witnesses:
C. L. MOREHOUSE,
A. J. NASLY.